United States Patent

[11] 3,572,921

| [72] | Inventor | Hans Mulch<br>Wetzlar, Germany |
|---|---|---|
| [21] | Appl. No. | 821,356 |
| [22] | Filed | May 2, 1969 |
| [45] | Patented | Mar. 30, 1971 |
| [73] | Assignee | Ernst Leitz GmbH Optische Werke<br>Wetzlar Lahn, Germany |
| [32] | Priority | May 8, 1968, June 19, 1968 |
| [33] | | Germany |
| [31] | | P 17 72 391.0 and P 17 72 682.8 |

[54] SLIDE PROJECTOR FOR STRAIGHT AND CIRCULAR SLIDE TRAYS
15 Claims, 8 Drawing Figs.

| [52] | U.S. Cl. | 353/117 |
|---|---|---|
| [51] | Int. Cl. | G03b 23/06 |
| [50] | Field of Search | 353/116, 117 |

[56] References Cited
UNITED STATES PATENTS

| 3,115,811 | 12/1963 | Mulch | 353/116 |
|---|---|---|---|
| 3,359,668 | 12/1967 | Badalich | 353/116 |
| 3,453,044 | 6/1969 | Schlessel | 353/116 |

*Primary Examiner*—Leonard Forman
*Assistant Examiner*—A. J. Mirabito
*Attorney*—Smyth, Roston & Pavitt

ABSTRACT: An adapter is disclosed which can be removably positioned in the tray receiving chute for a slide projector. The chute normally receives straight trays. The adapter positions circular trays in proper position relative to the slide exchange mechanism. The adapter may additionally be provided with a transmission to change the effective step length as between the regular tray moving projector pinion and the required angle for rotating a circular tray from compartment to compartment.

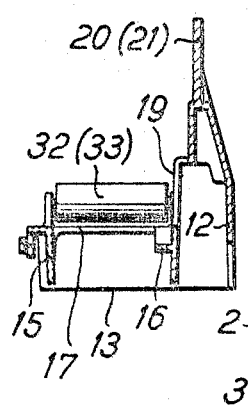
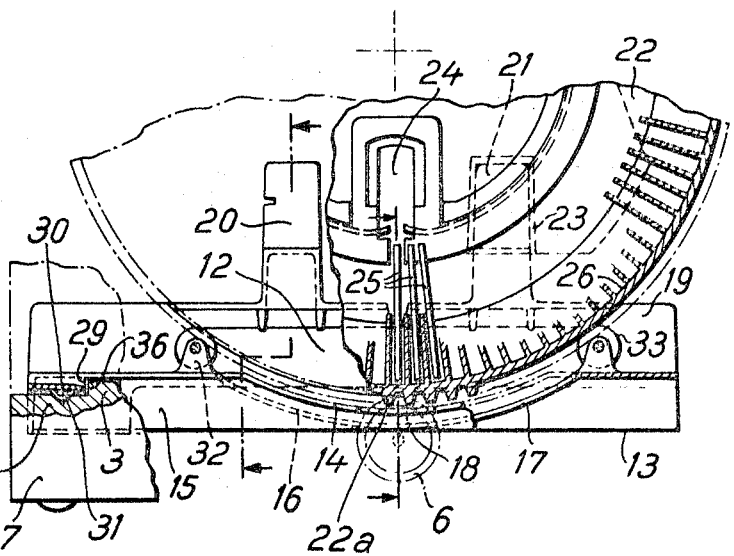
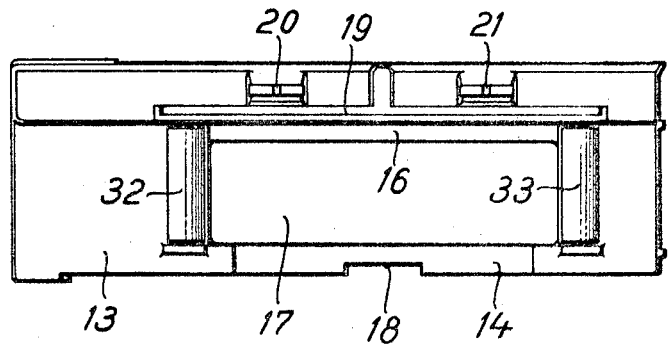

SLIDE PROJECTOR FOR STRAIGHT AND CIRCULAR SLIDE TRAYS

The invention relates to a slide projector, preferably of the type having a guide chute open from the top for receiving a slide tray. More particularly the invention relates to a slide projector which may receive circular, as well as straight, slide trays utilizing the same slide transportation and exchange mechanism in the projector.

Projectors are known, per se, in which a circular tray can be placed such that its axis of rotation is oriented transverse to the longitudinal extension of the tray receiving chute but parallel to the direction in which a slide is transported into and out of the projector. In order to orient a circular tray, particularly to the slide exchange mechanism, as well as to the plane in which a slide is positioned for projection, it is necessary to provide the chute with orienting and support means. These means have to be provided for sliding or rolling as the circular tray revolves on them. The gliding and rolling means must be spaced apart from each other by an angle not exceeding 120°, particularly if the circular tray is driven along its periphery; otherwise the tray may jam. It follows that the dimensions of conventional circular trays establish construction constraints for the gliding and rolling means. As a consequence of these constraints the support means for the circular tray themselves have position relative to the bottom of the chute so that they become a barrier and impediment for a conventional straight tray, if such were to be inserted. One can, therefore, position only such straight trays into the chute which are provided with indentations, slots or the like, particularly in their sidewalls, so that the tray can pass over or along the support elements for a circular tray. One side of the tray has to be provided relatively strong so that the support means can have sufficient overhang without, however, colliding with the slides in the tray.

It is an object of the present invention to avoid the disadvantages posed by the constraints mentioned above. Therefore, it is a particular object of the present invention to provide improved construction for slide projectors such that circular trays, as well as straight trays, can be used interchangeably, without requiring construction changes in either type of tray. It is another object of the present invention to provide specific equipment for slide projectors which are constructed to receive regular straight trays such that they can also receive circular trays.

In accordance with the preferred embodiment of the present invention it is suggested to provide an adapter for placement in the tray receiving chute of a slide projector, the chute being presumed to be constructed for receiving straight slide trays, and the adapter converts the chute to receive circular slide trays. The adapter receives a circular tray and establishes particular position so that the slides become oriented to the slide transport and exchange mechanism of the projector in the same manner as the slides in a straight tray when inserted in the chute without adapter. As the particular supporting means for the circular tray are removed together with the adapter as part thereof, a regular conventional straight tray can then be shifted through the receiver chute without encountering impediments.

The adapter is preferably provided as a slip-on or plug-in type element so that it can be placed without requiring additional locking or connecting elements. Additionally the adapter is provided to establish a particular position of the circular tray relative to the slide entrance in the projector. A circular tray is usually comprised of two elements rotatable relative to each other. The rotating part holds the several slide compartments. The stationary part serves essentially as bearing support for the rotating part. The adapter is now provided with means to position-lock the stationary part of a circular slide tray so that upon rotation of the rotating part the slide compartments sequentially enter the range of the transport mechanism.

In cases the slide tray receiver chute of a projector is provided with a starting ramp by means of which the slides are lifted from their regular position in a tray in a manner known, per se, to a level in which they can be placed in projecting position, merely by lateral shifting. The adapter is now oriented in relation to the effective height of the starting ramp such that the slides in the respective circular tray can also be shifted laterally in the level of the starting ramp into the projector.

If the circular tray is constructed such that a slide can be removed from a compartment therein merely by axial shifting, then the adapter must be constructed and proportioned such that the slide to be removed from the tray is already in the level of the slide runway in the projector when still in the tray so that it can be removed merely by lateral (axial) shifting. If the circular tray has a radially extending retaining ledge then the adapter positions the tray such that the ledge is level with the slide runway and the starting ramp projects into the tray to lift the slide above the ledge to that level. In essence, this is a matter of vertical positioning of the circular tray by the adapter and how deeply the adapter projects into the chute for defining the appropriate vertical position for the circular tray, particularly as to alignment of the tray exit slot and the projector slide entrance slot.

In case the circular tray is comprised of two parts, as stated above, whereby the rotating one has radial slots to receive the slides and is provided, in addition, with a low level ledge bar in order to prevent undesired dropping of a slide out of the tray, the adapter is to be oriented relative to the starting ramp such that the latter, as in the previous example, at least partially projects through an aperture into the circular tray and lifts at least one slide above the level of the ledge and up to the projection level of the projector, so that again the slide exchange mechanism can fetch and return the slide merely through lateral shifting.

Another feature of the present invention relates to adaptation of the tray drive in the projector for driving the circular tray by including drive adapting means in the adapter. The projector is presumed to be provided with a drive pinion in the usual manner. The pinion normally engages a rack on a straight tray for stepwise moving the tray past the slide entrance of the projector. That pinion can be used also for the transportation of a circular tray. However, previously the rim gear provided along the periphery of a circular tray had to match the rack on a straight tray, as far as distance from tooth-to-tooth of the gear was concerned. In other words, the gearing dimensions were fixed parameters which, in turn, had a fixed relationship to the compartment width.

A single rotary step of the drive pinion usually provides the transport motion by which the tray is shifted for the width of one compartment. In other words, the "step length" as provided by the drive pinion in the projector is a fixed operating parameter and a tray must be constructed such that for each step it is stopped indeed by a distance equal to one compartment width. The width is determined by the width of a compartment (in longitudinal direction) of a straight tray, as this type of tray is longer in use than a circular tray.

In a circular tray the compartments are radially oriented. As the pinion drives the tray on its outer periphery, and since the compartment width declines in radial inward direction to a width smaller than usual, the circular trays are usually unsuitable for receiving relatively thick slides, such as glass mounted slides. The only way to avoid undue narrowing of the compartments is to use very large circular diameters for the trays, as the larger the diameter, the less will be the relative decrease in compartment width in radial inward direction. However, for reasons of handling circular trays their capacity should not exceed 100 slides and the diameter of the tray should not exceed about 5 times the height of an individual slide. As a consequence of such constraints in overall size, a circular tray is usually unsuitable to receive glass-mounted slides.

In order to obviate these difficulties it is suggested to provide the adapter with transmission gearing which becomes interposed between the regular drive pinion in the chute and the peripheral gearing of a circular tray when placed on the adapter. It is particularly important here that the transmission gearing of the adapter is instrumental in rendering the peripheral gearing of the circular tray independent from the type of gear of the pinion. In general, the adapter thus permits projector adaptation to a particular construction of the circular tray so that the latter is not subject any more to the constraints imposed by the existing tray drive pinion. Moreover, the gearing construction for the trays themselves do not have to match any more the drive pinion of the projector as they do not mesh. The tray is driven through engagement with the rotary output of the transmission gearing of the adapter, so that the type of gearing interacting between transmission and tray can be entirely different from the type of gearing needed to mesh with the projector pinion. The length of the step, as well as the gearing itself, for moving a circular tray from compartment to compartment is thus made independent from the particular step provided by the regular project pinion and the particular construction thereof.

The transmission ratio for "step-to-step" translation as provided by the transmission gear in the adapter is selected such that the circular tray is rotatable over a step angle as determined by its compartment width and that width or distance measured from compartment to compartment may differ from the analogous width or distance of regular straight tray to offset the radial inward width reduction. The circular trays to be received by the adapter should still be subject to the overall constraints imposed for reasons of facilitating handling, in that the diameter of the tray does not exceed the height of about five slides, but such a tray has less compartments than the conventional one because the compartments are sufficiently wide so that, in fact, glass-mounted slides can be placed in them.

In order to obtain maximum capacity the distance between the dividers defining the compartments is preferably chosen such that the width of the compartments in the operational level of the slide exchanger correspond to the compartments' width in straight trays. This width is measured in the radially innermost region of a compartment.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings in which:

FIGS. 3 and 4 illustrate on a reduced scale respectively an elevational section and top elevation of the adapter itself;

FIG. 5 is drawn to the same scale as FIGS. 3 and 4 and shows a longitudinal section through receiver chute and adapter together with an inserted circular slide tray;

Figure 1:
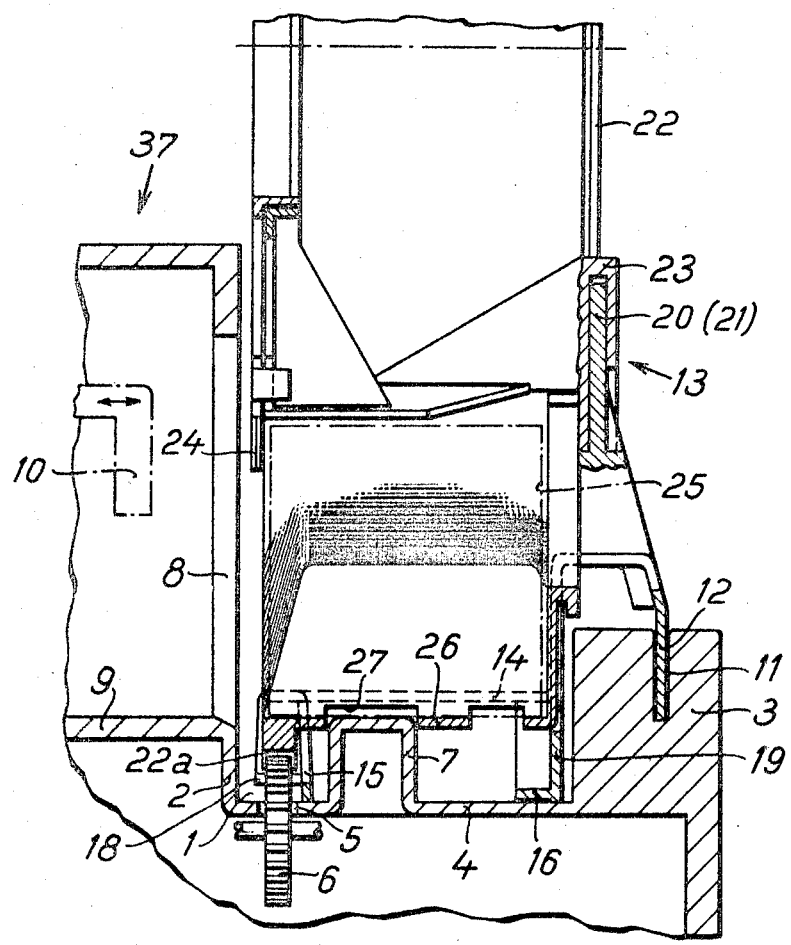
FIG. 1 illustrates a sectional view into the tray receiving chute of a slide projector with an adapter in accordance with the present invention and further showing in parts an inserted circular tray.

Proceeding now to the detailed description of the drawings in FIG. 1, et seq., thereof, is illustrated a portion of a slide projector 37 showing particularly a guide or tray receiving chute 1 defined by a wall 2 pertaining to the projector housing; by a laterally displaced wall portion 3, and by a bottom 4, joining wall 3 to wall 2. Bottom 4 has an aperture 5 through which projects a drive pinion 6 for transporting a slide tray when inserted in the chute. The center portion of the bottom has a starting ramp 7 which is inclined in a plane transverse to the plane of the drawing of FIG. 1. The highest point of ramp 7 is disposed in the plane of an opening 8 traversing wall 2, which is also the plane of the drawing of FIG. 1.

Opening 8 is the projector entrance for slides. A slide passes through opening 8 to be placed into projecting position. For this a gripper 10 pulls a slide into entrance 8, whereby the slide rides on a runway 9. Element 10 is part of a slide changing mechanism and is only shown partially. The slide exchanger is not part of the invention and elements 8, 9 and 10 are shown here only to facilitate orientation in relation to conventional equipment.

Figure 2:
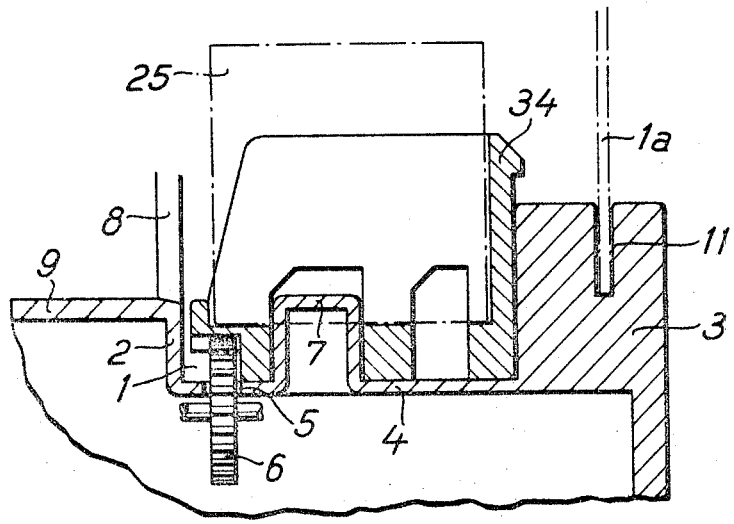
FIG. 2 illustrates the chute shown in FIG. 1 with adapter removed and inserted straight slide tray.

The chute does not require additional elements for receiving straight slide trays such as tray 34 in FIG. 2. However, for adapting the projector to circular trays, an adapter 13 is provided. The rather thick sidewall 3 of the projector chute is provided with a slot 11 which does not penetrate vertically all the way through the wall but extends horizontally (transverse to the plane of the drawing) throughout the extension of wall 3 in that direction. The adapter 13 is provided with a flat holding rail 12 which can be slipped into slot 11. With adapter 13 removed, the slot 11 may receive a normal cover 1a for covering chute 1 (FIG. 2). The adapter 13 projects into the chute 1 by means of a base pen 14, which, in turn, has a support rail 15 resting on the bottom 4 of the chute between ramp 7 and wall 2. The length of the adapter 13 matches the dimension of chute 1.

Adapter 13 has a downwardly curved, depressed portion 16 (see FIGS. 4 and 5), which is provided with an aperture 17 for receiving ramp 7 when the adapter is placed in position. Additionally, the central portion 16 is provided with a recess 18 through which may pass the drive pinion 6. A sidewall 19 of adapter 13 terminates upwardly in two tongues 20 and 21 which serve as receiver element for a circular tray 22. Circular tray 22 is provided with correspondingly contoured pockets 23 into which tongues 20 and 21 are slipped when the tray is placed into the chute. Position of the tongues 20 and 21 is selected such that the circular tray becomes particularly positioned in relation to aperture 8.

In order to orient the adapter itself horizontally within the chute 1, the adapter is provided with a stop 29 resting against a vertical edge 36 in wall 3 of projector 37. As the adapter is slid into the chute, i.e., as bar 12 is slid into slot 11, abutment of stop 29 at housing 36 defines the proper horizontal position of the adapter such that the tongues 20 and 21 become symmetrically placed in relation to entrance 8. In order to lock the adapter in the desired operating position there is provided a resilient stop 30 resting in a corresponding notch 31 in wall 3 of the guide chute and thereby locking the adapter in position.

Rollers 32 and 33 support the circular tray on its periphery when positioned on adapter 13 which, in turn, is properly positioned at chute 1. The vertical dimensions of support rail 15, as well as of rail 12, define the vertical level of the adapter relative to the projector and, for a given vertical distance between the peaks of tongues 20 and 21 and the lower edge of rail 12 the height of the axis of a tray 22 above the chute, as well as the lowest level of the horizontally oriented tray cylinder, is defined therewith. The lowest compartment is the one which holds the slide to be placed into the projector, and its level is determined accordingly.

A circular tray, when placed in a properly positioned adapter, thus establishes the following particular position relationships. (1) A slot 24 of the nonrotating stationary tray portion faces exactly aperture 8 of wall 2, as far as vertical, as well as horizontal orientation is concerned. A slide to be removed from the tray must be in the compartment registering with slot 24. (2) Peripheral gearing 22a of circular tray 22 meshes pinion 6. (3) A particular portion of the peripheral wall 26 of the slide tray serves as bottom support for the slide which is or is about to enter the projector through entrance 8 thereof. That portion of peripheral wall 26 is in the same level as runway 9. One can see that this condition is actually a particular subcondition of relation (1). The center portion of the starting ramp has a height to be on the same level of the runway 9. The tray, particularly the dividers therein, are provided with peripheral recesses 27 so that the ramp can enter the tray to that extent.

Figure 6:
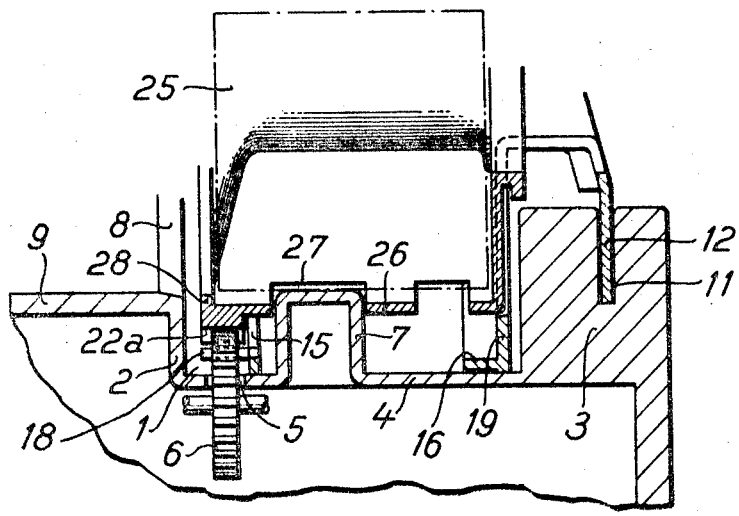
FIG. 6 illustrates a modification of the adapter.

Slide 25 in the compartment when aligned with opening 8 in this manner finds horizontally registering pathways along wall 26, ramp 27 and runway 9. The registering of these pathways presupposes, however, that the slide tray is constructed to permit straight passage of a slide across opening 24 of the tray. However, the tray may have a low circular ledge 28 which extends across the lower part of opening 24 and above which the slide has to be lifted. An adapter for such types of trays has lower support tongues 20 and 21 and lower rolls 33, so that the tray, when slipped with its pockets onto the tongues, drops deeper into chute 1. This is illustrated in FIG. 6. In particular, the peripheral wall portion 26 of the tray on which the lowest slides rest normally is in its lowest point below the level of ramp 7 and of runway 9; the down level shift equals the height of ledge 28. Thus, ramp 7 lifts the slide relative to the tray such that its lower edge can pass across ledge 28, which, in its highest point, is on the same level as ramp 7 and runway 9.

As one can see from FIG. 2, a straight tray 34 of known construction can be set into guide chute 1 in lieu of the circular tray, after the adapter 13 has been removed the straight tray is now shifted along the bottom 4 in the usual manner, as its rack meshes pinion 6, and the slide transport and exchanger operates in an analogous manner.

The adapter as described above is, of course, destined to serve in a particular projector, but the principles involved here permit construction such that an adaptation to any type of projector is possible when using the same principles but varying merely details on dimensions. It can be made optional to modify the construction such that the adapter can be slid into position from the top or from the side of the chute.

Figure 7:
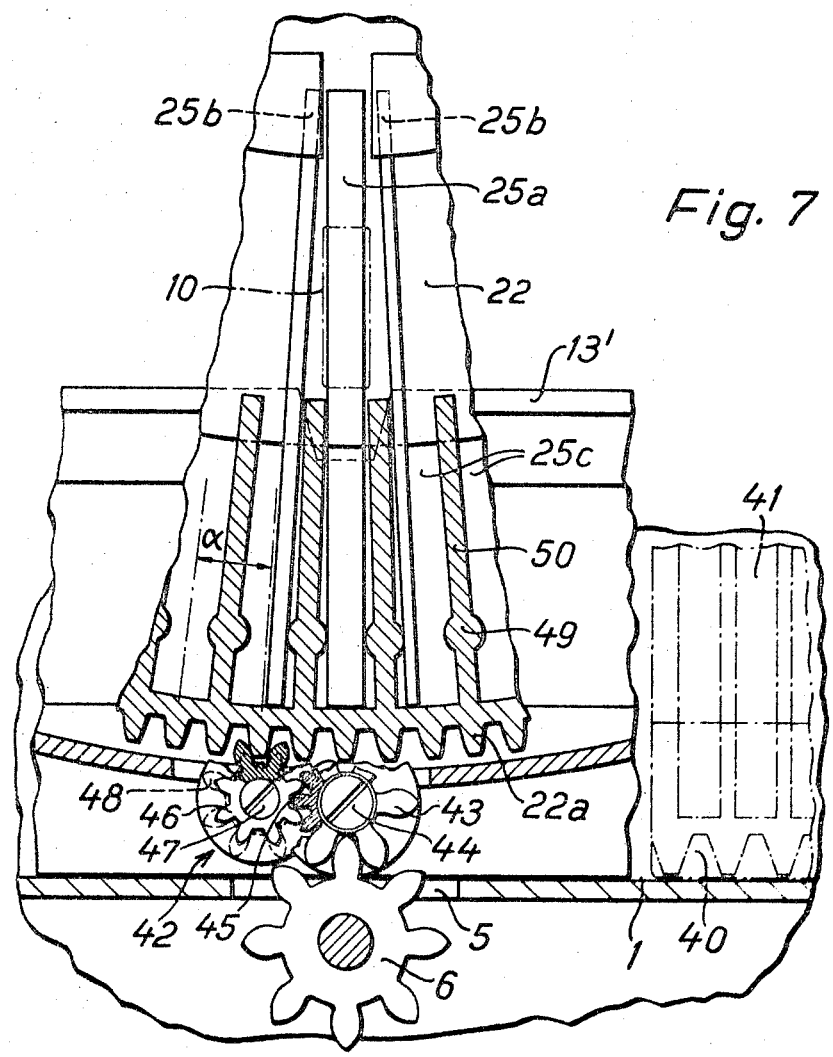
FIG. 7 illustrates a section view of a portion of an adapter which includes transport mechanism for stepwise transportation of a circular tray and includes in parts the position-relation of a straight tray if inserted in the alternative.
Figure 8:
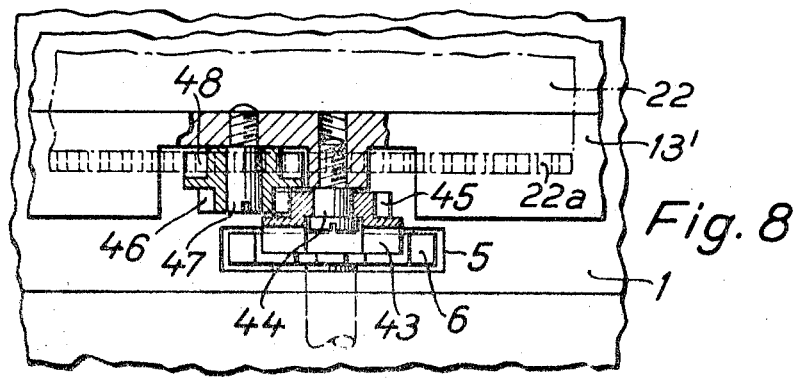
FIG. 8 illustrates top elevation of the view shown in FIG. 7.

Turning now to the embodiment shown in FIGS. 7 and 8, there is again illustrated the drive and transport pinion 6 mounted in relation to chute 1 of the projector. Some of the teeth of pinion 6 project through the opening 5 of guide chute 1 and mesh directly with a rack 40 of a straight tray 41 dash-dotted in the drawing if such straight tray is inserted. The pinion 6 is driven in a manner known, per se, and the drive mechanism is, therefore, not illustrated. Briefly, there will be a motor included in the projector and a step drive mechanism is interposed between motor and pinion 6 to cause the pinion to move by one step for each slide change.

In lieu of a straight tray one can use a circular tray 22, as mentioned above. For this purpose there is provided the adapter 13' which is removably slid into chute 1, for example, as outlined above. The adapter 13' is provided with means for positioning and orienting a circular tray, also as described above. However, the adapter positions the circular tray such that its peripheral gearing 22a does not mesh directly with pinion 6. Instead, the adapter serves here as a carrier of a transmission 42 which drivingly links the pinion 6 with the peripheral gearing 22a of the circular tray.

The transmission gear 42 is comprised of a driven gear wheel 43 meshing pinion 6 and serving as rotary input. The wheel 43 is mounted on a shaft 44 upon which is mounted further the gear wheel 45. The latter meshes with a gear wheel 46 mounted on a shaft on which, in turn, is mounted the drive wheel 48, which engages peripheral gearing 22a of the circular tray when inserted. Wheel 48 is thus the driving output of the transmission. The transmission is constructed such that for each step of pinion 6, circular tray 22 is moved by an angular step $\alpha$, which angle $\alpha$ is equal to the angular width of each slide compartment in tray 22. In the illustrated example, the transmission ratio is chosen to be 1:2.

It follows, therefore, that the gearing of the circular tray can be selected independently from the angular width of a compartment therein, i.e., the peripheral gearing 22a of the circular tray does not have to be selected such that a transport pinion 6 normally transporting straight trays rotates a circular tray directly for a compartment width angle for each step. In the disclosed embodiment, the angular compartment width is selected wider such that glass cover mounted slides such as 25a, as well as slides mounted without glass covers, such as 25b, can selectively be placed in any of the compartments 25c.

The enlargement of compartment width involves particularly a suitably wide distance between partitions in the inner tray region so that the compartments are wider than usual near the periphery. The peripheral gear of the tray must thus be driven for each step over a distance which corresponds to that larger compartment width adjacent the periphery.

The compartments are defined by portions 50 which have protrusions 49 to adapt the compartment to the differences in distance between the several slides resulting from the radial arrangement thereof. The partitions are selected such that in the level of slide exchanger 10 the effective distance of the partitions are about equal to the usual distance and compartment width of a regular straight tray of conventional design. Therefore, the utilization of a circular tray for storing glass covered slide does not present any difficulties for the slide transport and exchanger.

The invention is not limited to the embodiments described above, but all changes and modifications thereof not constituting departures from the spirit and scope of the invention are intended to be included.

I claim:

1. In a slide projector having means defining a tray receiving chute for insertion of a straight slide tray, further having slide changing means cooperating with the inserted tray for placing a slide held in the tray into projecting position in the projector, an adapter removably disposed in the chute defining means and including, first means for supporting a circular tray and second means for particularly orienting the circular tray when positioned in the first means relative to the slide changing means.

2. Slide projector as set forth in claim 1, one of the adapter and the chute defining means being provided with plug-in means, the respective other one being provided with receiving means for receiving the plug-in means, plug-in means when inserted in the receiving means establishing particular position relation between adapter and chute defining means for particularly positioning a circular tray when in the first means of the adapter.

3. The combination as defined in claim 1 for cooperation with a two part circular tray means, the first part thereof remaining stationary while the respective other part holding the slides revolves in relation to the first part, the adapter including positioning means, the first part of the tray including means for interlocking with the positioning means for particularly positioning the circular tray in the adapter.

4. Slide projector as defined in claim 1 including means establishing a particular level for a slide to be slid into the projector by the slide changing means, the second means of the adapter having orientation to said level such that a slide in a circular tray received by the first means is positioned in that level.

5. Slide projector as set forth in claim 4, and including a slide lifting ramp in the chute, the second means of the adapter establishing a vertical position for a circular tray when supported by the first means so that the ramp can project into an opening in the circular tray.

6. The slide projector as set forth in claim 4, for cooperation with a circular tray having a circular ledge over which a slide has to be lifted, the first means supporting a circular tray such that the ledge registers with the particular level, the chute defining means including ramp means projecting into the circular tray when positioned by the second means for changing the level of one slide therein to the particular level.

7. Slide projector as set forth in claim 1, including a pinion for meshing with transportation gearing on a straight tray, the first and second means of the adapter positioning a circular tray when supported by the first means so that peripheral gearing of the circular tray drivingly engages the pinion.

8. Slide projector as set forth in claim 1, including pinion means for meshing with transportation gearing on a straight tray when inserted in the chute, transmission means on the adapter having rotary input for engagement with the pinion and rotary output for engagement with peripheral gearing on a circular tray.

9. Slide projector as set forth in claim 8, the transmission gearing on the adapter providing a transmission ratio such that each step motion of the pinion is translated into a rotary step of the circular tray having angular width equal to the angular distance between two adjacent compartments.

10. For cooperation with a slide projector having a tray receiving chute for insertion of a straight slide tray, further having slide changing means operating transverse to the direction of extension of the chute and reaching into the chute for moving a slide between the interior of the projector and a tray when inserted in the chute, further having drive means for engagement with an inserted tray to stepwise move the tray in the direction, an adapter comprising first means for supporting a circular tray in particular position of its axis and including means for rotatably guiding the movable portion of the circular tray having slide containing compartments; and second means for removably and particularly positioning the adapter in the chute so that the axis of a circular tray when supported by the first means is transversely oriented to the said direction and parallel to the operating direction of the slide changing means.

11. The adapter as set forth in claim 10, the first means including means to position-lock the stationary part of a two part circular tray.

12. The adapter as set forth in claim 10, and including transmission means having rotary input for engagement with the pinion and rotary output for engagement with the movable portion of a tray when supported by the first means, and providing transmission of stepwise rotation of the pinion to rotate the movable part of the tray over an angle equal to the compartment width.

13. The adapter as set forth in claim 12, the angular step as provided by the output of the transmission means being effective in the level of the slide exchange means to correspond to the step as directly provided by the pinion when engaging a straight tray.

14. The adapter as set forth in claim 10, the first means positioning the second means in the vertical relative to the level of lateral motion of a slide when moved by the slide mechanism, so that the second means positions the axis of a circular tray at a height of about the radius of the circular tray above that level.

15. The adapter as set forth in claim 10, the first means suspending a circular tray in a chute such that the effective axial border of the compartment aligned with the exchange mechanism is level with a runway in the projector over which the mechanism moves the slide.